Nov. 4, 1947.  R. J. CAMPSMITH  2,430,044
SCREW DRIVER AND THE LIKE
Filed Sept. 19, 1945
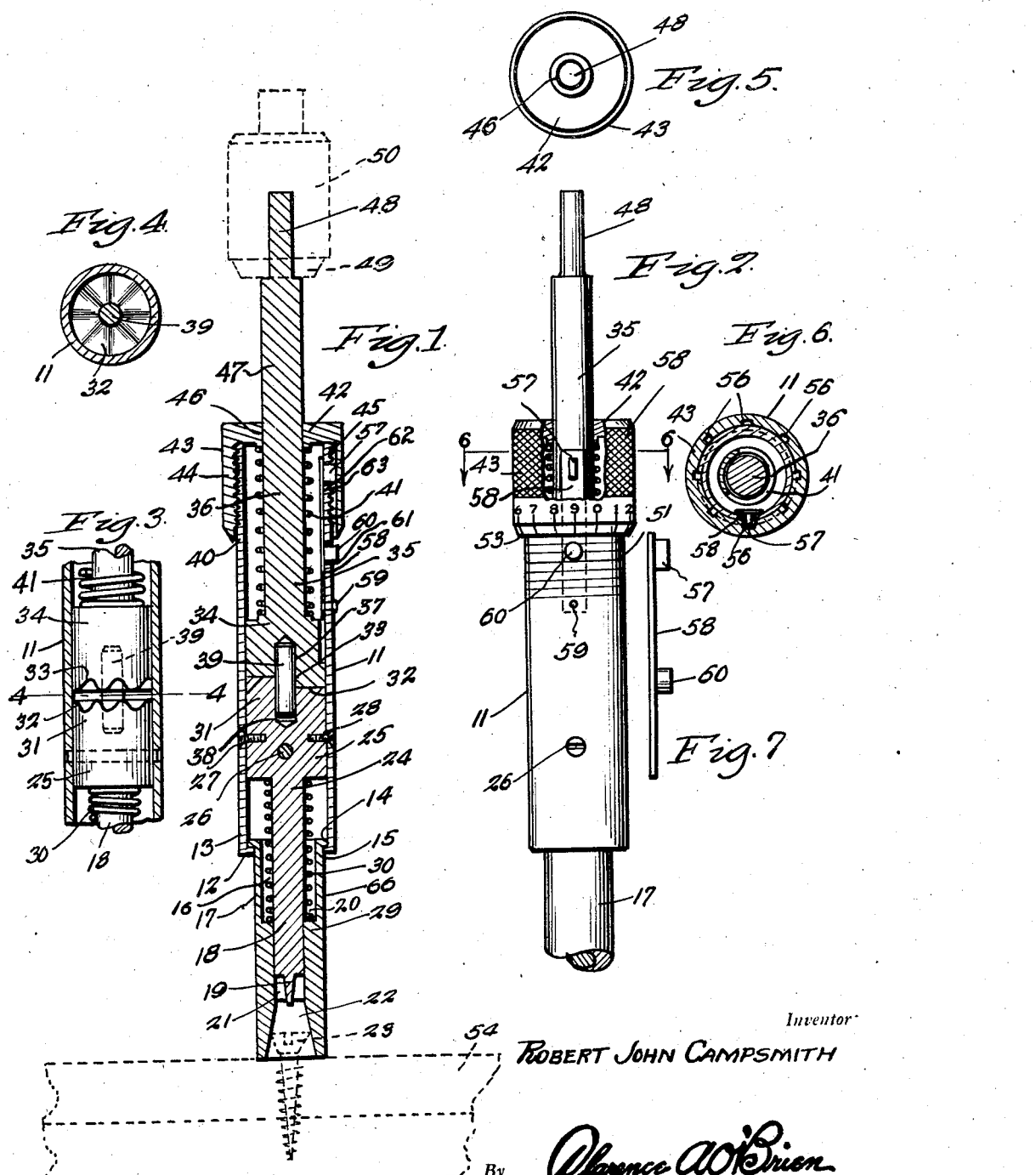
Inventor
ROBERT JOHN CAMPSMITH
By Clarence A. O'Brien
and Harvey B. Jacobson
Attorneys Patented Nov. 4, 1947

2,430,044

UNITED STATES PATENT OFFICE 2,430,044

SCREW DRIVER AND THE LIKE

Robert John Campsmith, Chicago, Ill.

Application September 19, 1945, Serial No. 617,224

1 Claim. (Cl. 145—76)

My invention relates to improvements in screw driving tools and has for its object to provide means whereby a screw may be rapidly driven home.

Another object of this invention is to provide a power screw driver so constructed that it will cease turning when the screw reaches the desired depth.

A further object of my invention is to provide a rotary tool having means whereby the same will cease operation upon reaching a predetermined position.

A still further object of my invention is to provide in a rotary tool a depth gauge and control.

Other features and advantages will become more readily apparent from the following description and the accompanying illustrative drawings in which:

Figure 1 is a longitudinal sectional view of my tool,

Figure 2 is an elevational view thereof shown partly broken away,

Figure 3 is a detail of a clutch,

Figure 4 is a section on line 4—4 of Figure 3,

Figure 5 is a plan view of a gauge member,

Figure 6 is a sectional view on line 6—6 of Figure 2, and

Figure 7 is a detail of gauge lock.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

The invention disclosed in the accompanying drawings consists of a cylinder 11, having an inturned flange 12, at its lower end 13, upon which seats an out-turned flange 14, on the upper end 15, of the enlarged tubular portion 16, of a guide 17, for the shank 18, which in the present instance is provided with a screw driver terminal 19, in the reduced bore 20, the lower end 21, of which terminates in a conical cavity 22, to receive screw heads 23, of varying diameter. The upper end 24, of the shank 18, terminates in an enlarged head 25, fixed to the cylinder 11, by means of a pin 26, and screws 27 and 28, to rotate with said cylinder 11.

Seated between the head 25, and the shoulder 29, formed by the reduced bore 20, is a spring 30, coiled around said shank 18, which spring is adapted to hold the guide 17, normally in lowered position. The upper end 31, of head 25, forms a clutch member 32, adapted for engagement with a similar clutch member 33, formed in the lower face of the enlargement 34, of the lower end 35, of a shank 36. The members 34 and 25 are provided with opposing center bores 37 and 38, within which seats a pin 39.

Within the upper part 40, of the cylinder 11, a strong spring 41, is coiled around the shank 35, and seats between the member 34, and the head 42, of a cap 43, internally threaded as at 44, to screw upon the threaded upper terminal 45, of the cylinder 11. The said head 42, is provided with a bore 46, through which the upper end 47, of the shank 36, extends. The terminal 48, is shaped to fit into the pod 49, of a brace bit socket 50.

The cap 43 will be screwed down over the outer, upper surface 51 of the member 11, the lower edge 53 of the cap 43 indicating the distance the cap 43 must be screwed down for the purpose of compressing the spring 41, in order to hold the said clutch members interengaged until the screw has been sunk its full length at which time the tension of the spring, as adjusted, will no longer hold said clutch members together and the slipping of which one over the other will through the noise or vibration signify to the operator that the screw has reached its limit of insertion in the material 54.

The inner cylindrical surface 55, of the cap 43, is provided with a series of vertical channels 56, which are adapted to receive the key 57, on the free end of the leaf spring 58, fixed to the inner surface of the member 11, by a rivet 59. The spring 58, is provided with a button 60, operating through a bore 61, in the member 11, by means of which the key 57, may be released to permit the cap 43, to be turned. A slot 62, is provided through the wall 63, through which the key is adapted to project for engagement with any one of the slots 56. The purpose of locking the cap is in order to keep it from turning as the cylinder 11, is rotated by a brace or drill chuck.

The rotation of shank 36, by a brace or lathe or drill chuck will rotate cylinder 11, through head 25, for a predetermined time and with them the shank 18, to drive the screw 23. After the screw is driven home the clutch will slip. The spring 30, will give as the screw enters the member 54, to permit the screw driver blade 19, to follow the screw down on in. The elongated recess 22, will act to guide the screw and to hold it in true alignment with the screw driver.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

The described device comprising a cylinder, a screw-driver secured therein, a clutch head at the free end of said screw driver, a plunger slidably disposed in said cylinder, a clutch head on the lower end of said plunger facing the clutch head on said screw driver, a coil spring disposed about said plunger for maintaining the screw drive clutch head and the plunger clutch head in engagement, a pin aligning said clutch members, a hollow cylinder movably mounted in said first mentioned cylinder through which said screw driver projects, said hollow cylinder having a flared entrance, a coil spring about said screw driver for normally holding the same in raised position, a cap threaded upon said first mentioned cylinder provided with a series of longitudinal slots, means within said cylinder for engaging said slots, said means comprising a spring having a button projecting through an opening in said cylinder and a key spaced from said button projecting through another opening in said cylinder adapted to selectively enter one of said slots.

ROBERT JOHN CAMPSMITH.

REFERENCES CITED

The following references are of record in the file of this patent:

UNITED STATES PATENTS

| Number | Name | Date |
| --- | --- | --- |
| 1,855,456 | Miller | Apr. 26, 1932 |
| 1,126,219 | Hupp | Jan. 26, 1915 |
| 1,503,446 | Hedglon | July 29, 1924 |